United States Patent
Templeman et al.

(10) Patent No.: US 9,954,206 B2
(45) Date of Patent: Apr. 24, 2018

(54) BATTERY HOLDER AND ISOLATION ASSEMBLY

(71) Applicant: King Products, LLC, Lenexa, KS (US)

(72) Inventors: Jon Clayton Templeman, Lenexa, KS (US); Brock Christian Templeman, Lenexa, KS (US)

( * ) Notice: Subject to any disclaimer, the term of this patent is extended or adjusted under 35 U.S.C. 154(b) by 342 days.

(21) Appl. No.: 14/584,835

(22) Filed: Dec. 29, 2014

(65) Prior Publication Data

US 2015/0188104 A1 Jul. 2, 2015

Related U.S. Application Data

(60) Provisional application No. 61/921,308, filed on Dec. 27, 2013.

(51) Int. Cl.
*H01M 2/10* (2006.01)

(52) U.S. Cl.
CPC ...... *H01M 2/1077* (2013.01); *H01M 2220/20* (2013.01)

(58) Field of Classification Search
CPC .............. H01M 2/10; B60K 1/04; B60K 6/28

USPC ......................................................... 429/100
See application file for complete search history.

(56) References Cited

U.S. PATENT DOCUMENTS

| | | | |
|---|---|---|---|
| 2007/0026304 A1* | 2/2007 | Jeon ...................... | B60L 3/0046 429/156 |
| 2009/0239136 A1* | 9/2009 | Nagamine ........... | H01M 2/1077 429/148 |

* cited by examiner

*Primary Examiner* — James Lee
(74) *Attorney, Agent, or Firm* — Hovey Williams LLP

(57) ABSTRACT

A battery holder comprises a jacket, an upper plate, and a retainer bracket. The jacket forms an open-topped chamber and includes an upper outwardly extending lip. The upper plate and the retainer bracket are fastened to the upper lip for securing a battery in the open-topped chamber. Another embodiment of the battery holder comprises a lower mat, an upper mat, and a strap. The lower mat and the upper mat include at least one pad formed of shock-absorbing material and having a number of openings for allowing the pad to bulge outwardly and flex inwardly. Another embodiment of the battery holder comprises a lower mat and a number of clips. The lower mat includes a shock absorbing pad. The clips secure a battery to the lower mat and include a number of slits for preventing the battery from sliding.

7 Claims, 15 Drawing Sheets

BATTERY HOLDER AND ISOLATION ASSEMBLY

RELATED APPLICATION

The present application is a non-provisional patent application and claims priority benefit, with regard to all common subject matter, of earlier-filed U.S. provisional patent application titled "BATTERY HOLDER AND ISOLATION ASSEMBLY", Ser. No. 61/921,308, filed Dec. 27, 2013, incorporated by reference in its entirety into the present document.

BACKGROUND

Vehicles such as cars and boats typically include one or more batteries for storing and providing electrical power. These batteries often fail prematurely or have reduced performance due to excessive vibrations and shocks generated or transmitted by the vehicles. This is especially true for batteries used in cars, boats, personal watercraft, all-terrain vehicles, and other vehicles that operate in rough water or uneven terrain. All types of batteries, and particularly high performance batteries used in marine, off-road, and on-road applications, are expensive, difficult to replace, and difficult to safely dispose. Thus, prolonging their useful lives is highly desired.

SUMMARY

The present invention solves the above-described problems and provides a distinct advance in the art of battery holders. More particularly, the present invention provides a battery holder and isolation assembly that both secures a battery to a vehicle and mechanically isolates the battery from the vehicle.

A first embodiment of the battery holder and isolation assembly broadly includes a jacket, a top plate, a retainer bracket, and a number of fasteners.

The jacket receives the battery and includes a floor, sidewalls, and an outwardly extending upper lip. The jacket may be formed of molded plastic or any other suitable material. The floor and sidewalls form an open-topped chamber that is approximately the same size as the battery so as to snugly receive the battery therein. The jacket may be sized and shaped to receive batteries of any size and shape.

The top plate at least partially encloses the battery in the jacket and includes one or more openings for connecting cables to the battery terminals and/or accessing the battery fill caps.

The retainer secures the top plate on the jacket over the upper lip and includes a primary opening for positioning the retainer around the jacket.

The fasteners secure the top plate and the retainer together against the upper lip of the jacket.

A second embodiment of the battery holder and isolation assembly broadly includes a lower mat, an upper mat, and a strap.

The lower mat absorbs shocks and vibrations and is placed under the battery on a battery mounting surface, mounting bracket, or other surface. The lower mat may be at least partially formed of any shock-absorbing material such as rubber, gel, or foam and may include a number of openings extending therethrough for allowing the lower mat to bulge outward and stretch inward under compression and tension forces.

The upper mat absorbs additional shocks and vibrations and is positioned on top of the battery. The upper mat may be formed of any shock-absorbing material such as rubber, gel, or foam and may include a number of openings extending therethrough for allowing the upper mat to bulge outward and stretch inward under compression and tension forces.

The strap retains the upper mat on top of the battery and retains the battery on the lower mat. The strap extends over the upper mat and downward along the sides of the battery and is secured to a battery support platform or other surface. The strap may be a band, cable, chain, rope, bracket, or similar securement device and may include two sections and a buckle or other connector for connecting the two sections together.

A third embodiment of the battery holder and isolation assembly broadly includes a bottom plate, a middle pad, an upper plate, and one or more clips. The bottom and upper plates may be formed of rigid plastic, metal, or other suitable material. The middle pad may be at least partially formed of a shock-absorbing material such as rubber, gel, or foam and may include a number of openings extending therethrough for allowing the middle pad to bulge outward and stretch inward under compression and tension forces. The upper plate includes one or more flanges for securing the clips to the upper plate.

The clips secure the battery to the battery holder and may include inward extending tabs for extending over flanges of the battery. The tabs form receiving areas for positioning the battery flanges therein. The tabs may include one or more slits for receiving ribs of the battery therein and preventing the battery from sliding parallel to the clips. The clips may be screwed or otherwise fastened to the flanges of the upper plate.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Embodiments of the present invention are described in detail below with reference to the attached drawing figures, wherein.

Figure 1:
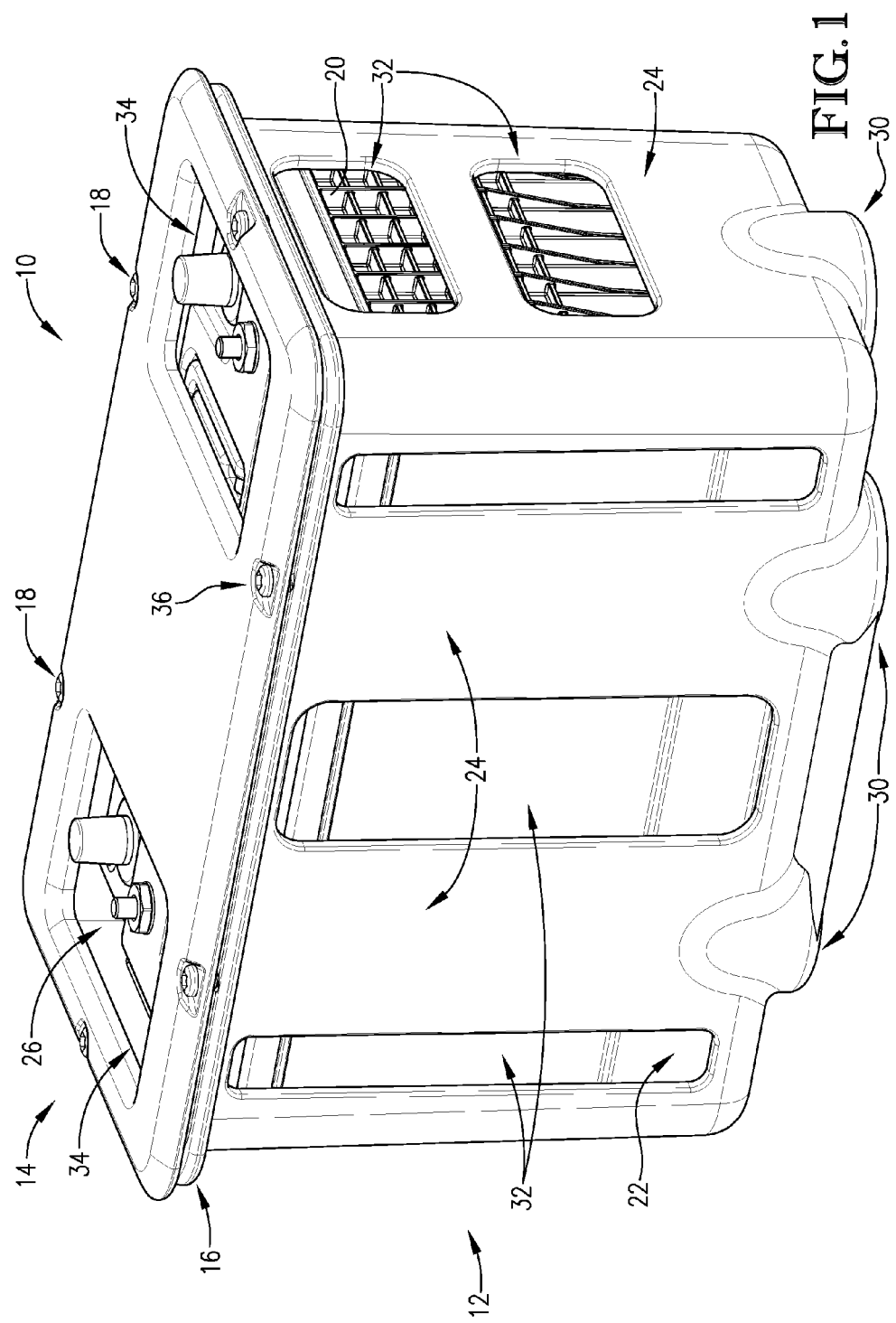
FIG. 1 is a top perspective view of a battery holder constructed in accordance with a first embodiment of the present invention and shown holding a battery.

The drawing figures do not limit the present invention to the specific embodiments disclosed and described herein. The drawings are not necessarily to scale, emphasis instead being placed upon clearly illustrating the principles of the invention.

DETAILED DESCRIPTION OF THE EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

Figure 2:
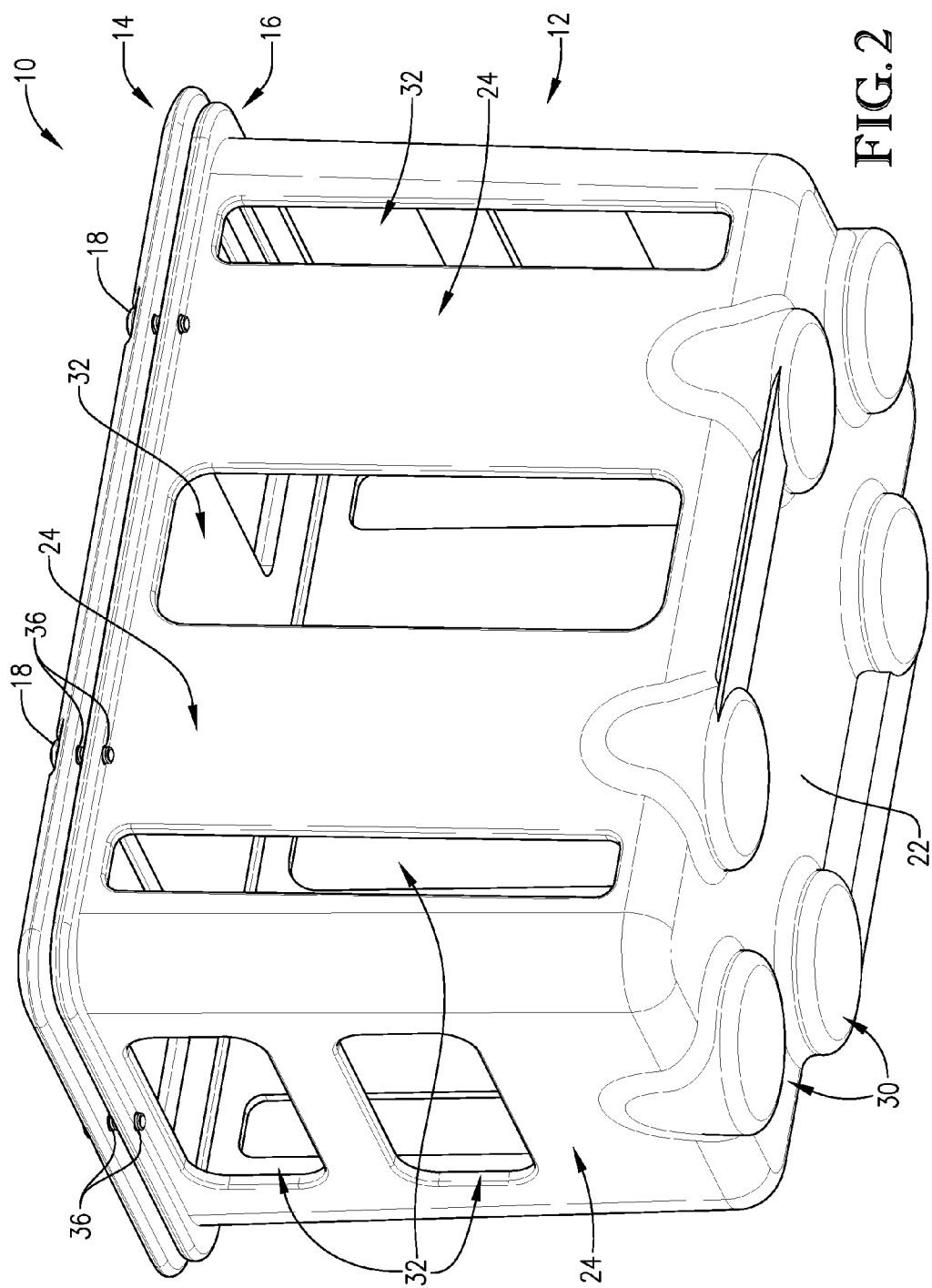
FIG. 2 is a bottom perspective view of the battery holder of FIG. 1 without the battery.
Figure 3:
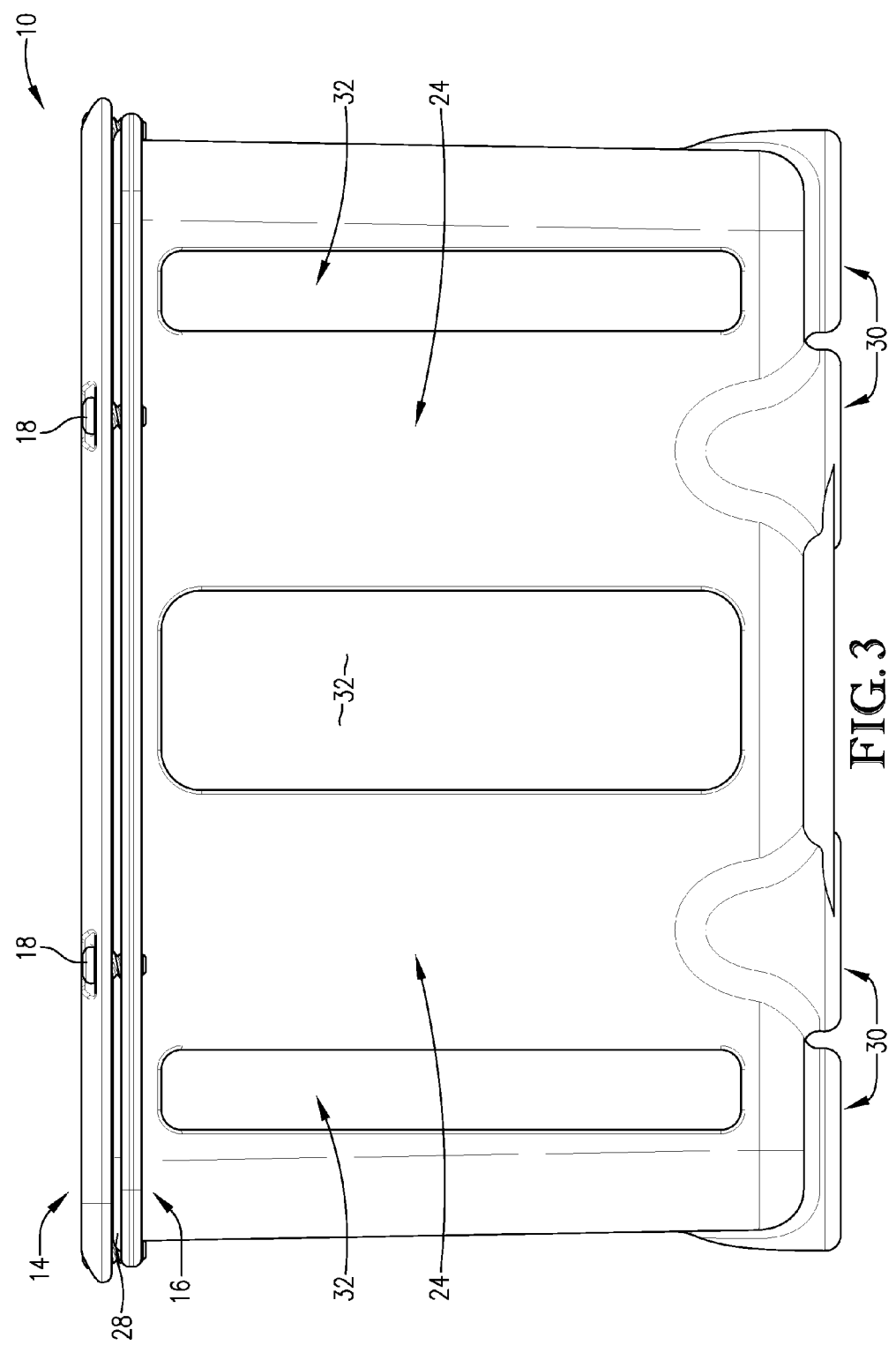
FIG. 3 is a front elevation view of the battery holder of FIG. 1.
Figure 4:
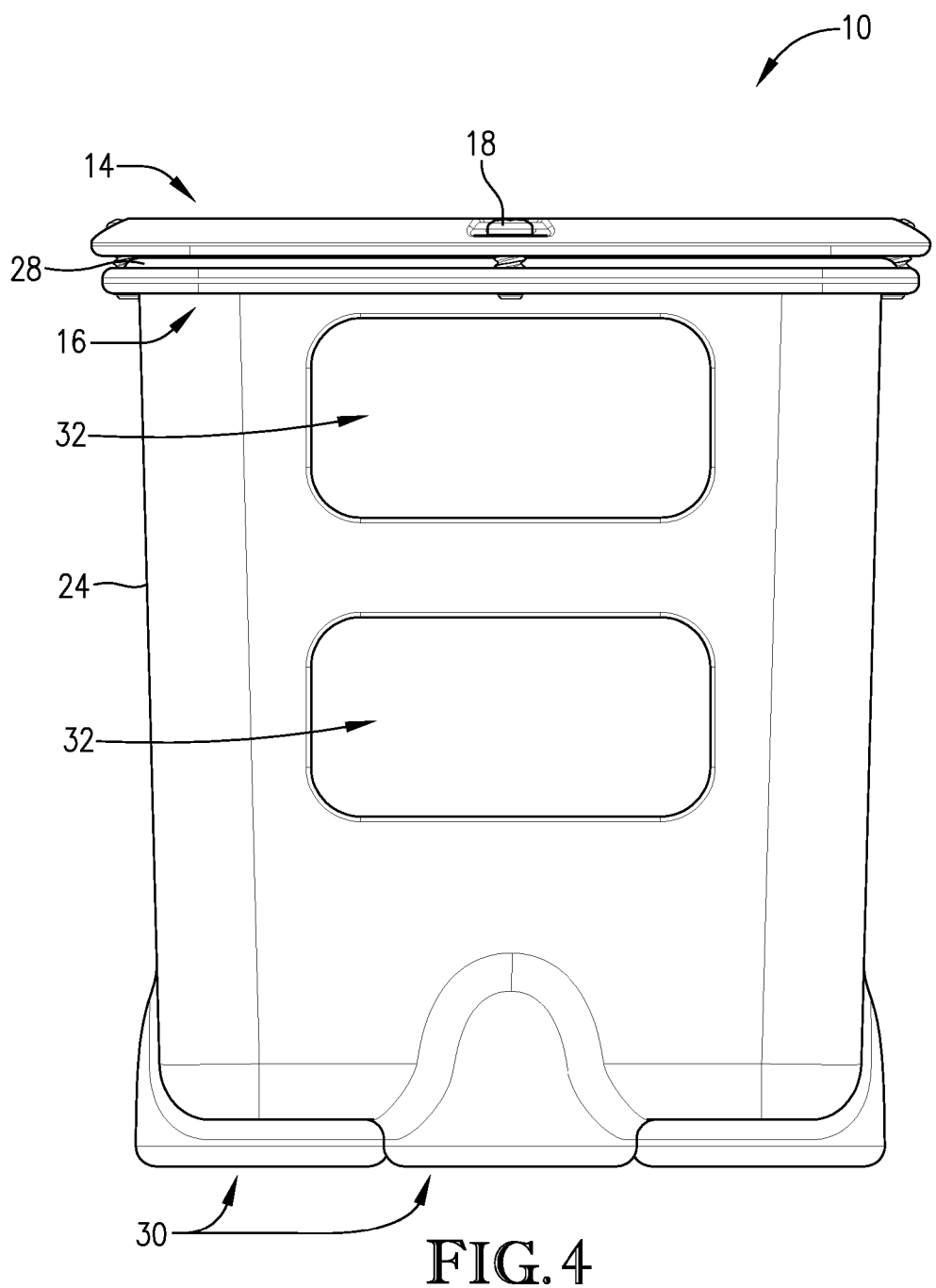
FIG. 4 is a side elevation view of the battery holder of FIG. 1.
Figure 5:
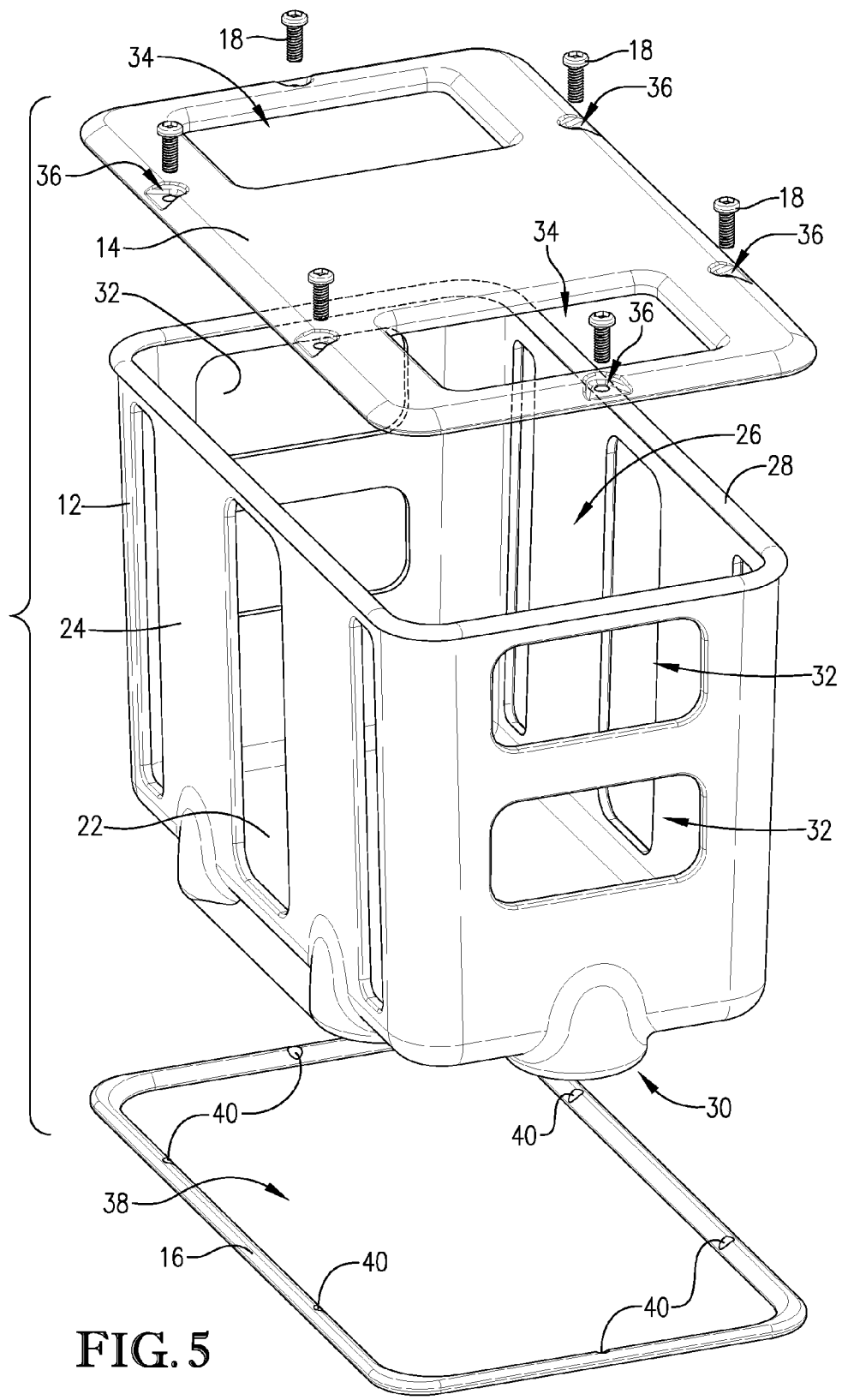
FIG. 5 is an exploded view of the battery holder of FIG. 1.

Turning now to FIGS. 1-5, a battery holder 10 constructed in accordance with a first embodiment of the present invention is illustrated. The battery holder 10 broadly comprises a jacket 12, a top plate 14, a retainer bracket 16, and a plurality of fasteners 18.

The jacket 12 retains and supports a battery 20 and may be formed of corrosion resistant billet or cast aluminum, molded plastic or rubber, or any other suitable material. The jacket 12 includes a floor 22, a number of sidewalls 24, an interior chamber 26, and an upper lip 28.

The floor 22 supports the battery 20 and may include a number of feet 30 extending downward therefrom. The feet 30 may be cylindrical columns or similar shape and may be attached to or integrally formed and/or molded of the same material as the jacket 12. The feet may be between 0.5 to 2 inches in diameter and between 0.5 to 2 inches tall. In one embodiment, the jacket 12 may include six feet with four of the six feet arranged in a rectangular pattern and the remaining two feet positioned on either side of the rectangular pattern. The feet 30 increase the shock absorbing and dissipation characteristics of the jacket 12 and raise the floor 22 off of the mounting surface.

The sidewalls 24 extend upwards along the sides of the battery 20 for protecting the battery 20 and may be between $\frac{1}{16}^{th}$ inch and 1 inch thick. The sidewalls 24 may include a number of openings 32 that permit the jacket 12 to flex and bulge when subjected to shocks, vibrations, and other forces. In one embodiment, the openings 32 do not extend all the way to the floor 22 so that any leaking battery fluid is retained in the interior chamber 26. At least two of the openings 32 may be elongated horizontal shapes for allowing the battery holder 10 to be gripped and picked up via the openings 32.

The interior chamber 26 receives the battery 20 therein and is open-topped for removing or replacing the battery 20. The interior chamber 26 may be substantially rectangular shaped and may be wider near its top and narrower near its bottom. The interior chamber 26 may be approximately the same size as the battery 20 so that the jacket 12 fits snugly against the battery 20 and forms a protective sheath around the battery 20. This prevents the battery 20 from being jostled within the interior chamber 26.

The upper lip 28 engages the top plate 14 and the retainer bracket 16 and extends outwardly approximately 0.25 to approximately 1 inch from top edges of the sidewalls 24. The upper lip 28 includes a number of fastener holes 36 for receiving the fasteners 18 therethrough.

The top plate 14 retains the battery 20 in the interior chamber 26 and may include one or more openings 34 for connecting cables to the terminals and providing access to filler caps of the battery 20. The top plate 14 may also include ridges, lips, or other contours that conform to contours on the top surface of the battery 20 and a number of fastener holes 36 for receiving the fasteners 18 therethrough. The top plate 14 may be formed of any suitable material such as corrosion resistant billet, cast, extruded, or sheet metal or rigid plastic and may be sized and configured to accommodate batteries of any size and shape.

The retainer bracket 16 retains the top plate 14 on top of the battery 20 and over the jacket 12 and may include a primary opening 38 for receiving the jacket 12 therethrough and a number of fastener holes 40 for receiving the fasteners 18 therethrough. The retainer bracket 16 slides over the bottom of the jacket 12 and is seated under the upper lip 28 of the jacket 12 for retaining the top plate 14 in place. The retainer bracket 16 may be formed of any suitable material such as corrosion resistant billet or cast aluminum, sheet metal, or rigid plastic and may be sized and configured to accommodate batteries of any size and shape. In one embodiment, the fastener holes 40 of the retainer bracket 16 (and the fastener holes 36 of the top plate 14) include six fastener holes with four of the six fastener holes arranged in a rectangular pattern and the remaining two fastener holes spaced on either side of the rectangular pattern for evenly securing the top plate 14 and the retainer bracket 16 against the upper lip 28 of the jacket 12.

The fasteners 18 secure the top plate 14 and the retainer bracket 16 to the upper lip 28 of the jacket 12. The fasteners 18 may be screws, bolts, clamps, pins, snaps, or any other suitable type of fastener. It will be understood that other fasteners such as clips, clamps, magnets, or other suitable fasteners may be used to hold the retainer bracket 16 and the top plate 14 on the upper lip 28.

The above-described battery holder 10 may be installed in a vehicle as follows: first, the jacket 12 is positioned on a battery mounting surface, bracket, or floor of the vehicle with the retainer bracket 16 positioned around the jacket 12. The battery 20 is then placed in the open-topped chamber 16 of the jacket 12. The top plate 14 is then positioned over the battery 20 so that the openings 34 of the top plate 14 expose the contacts and/or filler caps of the battery 20 and so that the top plate 14 extends over the upper lip 28 of the jacket 12. The retainer bracket 16 is then raised around the jacket 12 just below the upper lip 28 so that the fastener holes 36 of the top plate 14 and the fastener holes 40 of the retainer bracket 16 are aligned. The fasteners 18 are then inserted through the fastener holes 36, 40 and tightened so that the top plate 14 and the retainer bracket 16 are sandwiched on the upper lip 28.

When the battery holder 10 is installed in the vehicle, the jacket 12 and the top plate 14 protect the battery 20 from external shocks and from contacting other objects (especially if the battery 20 and battery holder 10 are not directly secured to the vehicle). The jacket 12 and the feet 30 prevent vibrations and shocks from passing to the battery 20.

The above-described battery holder 10 provides several advantages over conventional battery holders. For example, the battery holder 10 protects the battery 20 on all sides and absorbs shocks, vibrations, and other forces. The interior chamber 26 retains any leaking battery fluid therein. The openings 32 in the jacket 12 provide ventilation to the battery 20 and allow the battery 20 and the interior chamber 26 to be visually inspected. The battery holder 10 can accommodate batteries of different sizes and provides an ergonomic contour that prevents other objects from catching on the battery holder 10.

Figure 6:
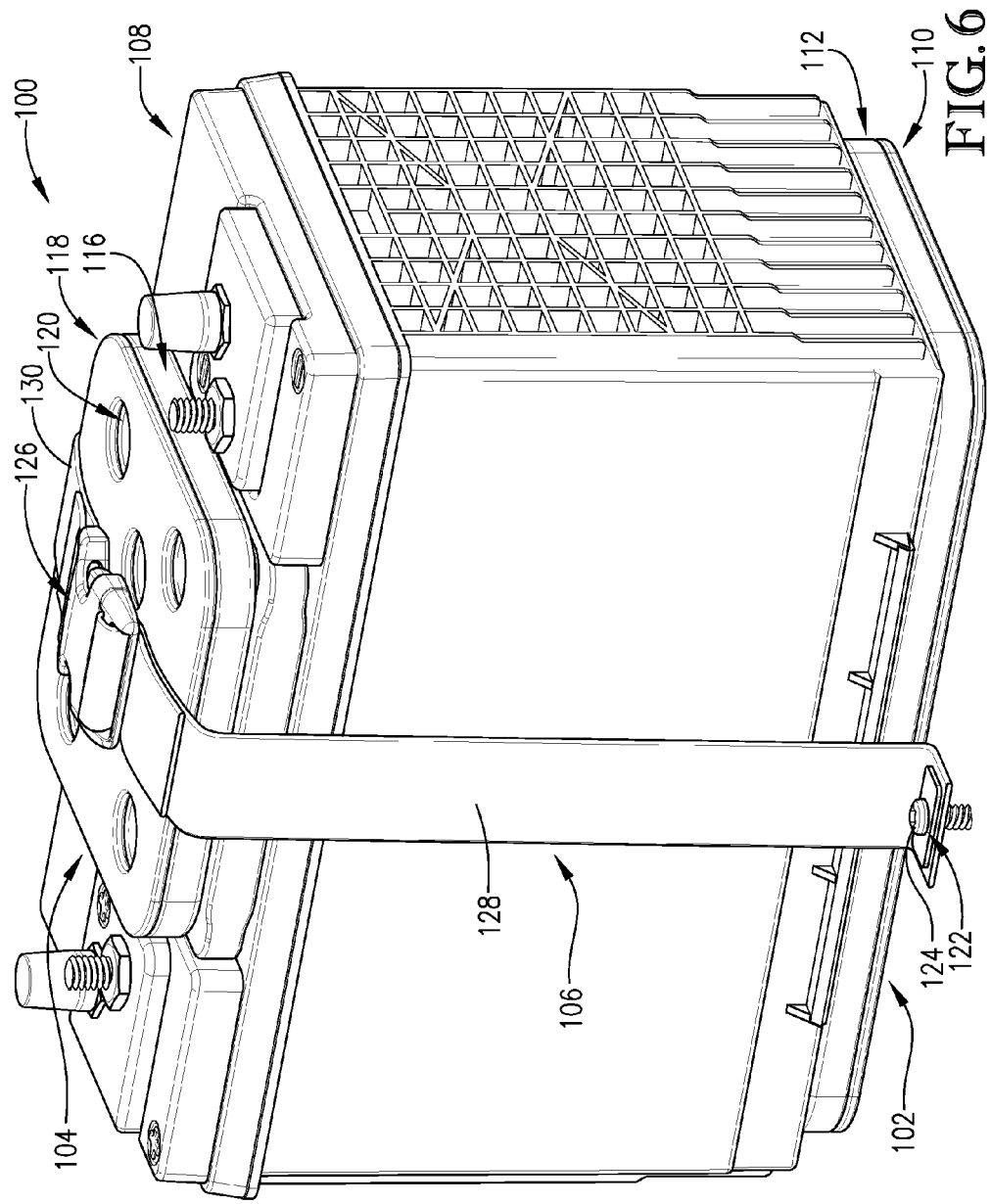
FIG. 6 is a top perspective view of a battery holder constructed in accordance with a second embodiment of the present invention and shown holding a battery.
Figure 7:
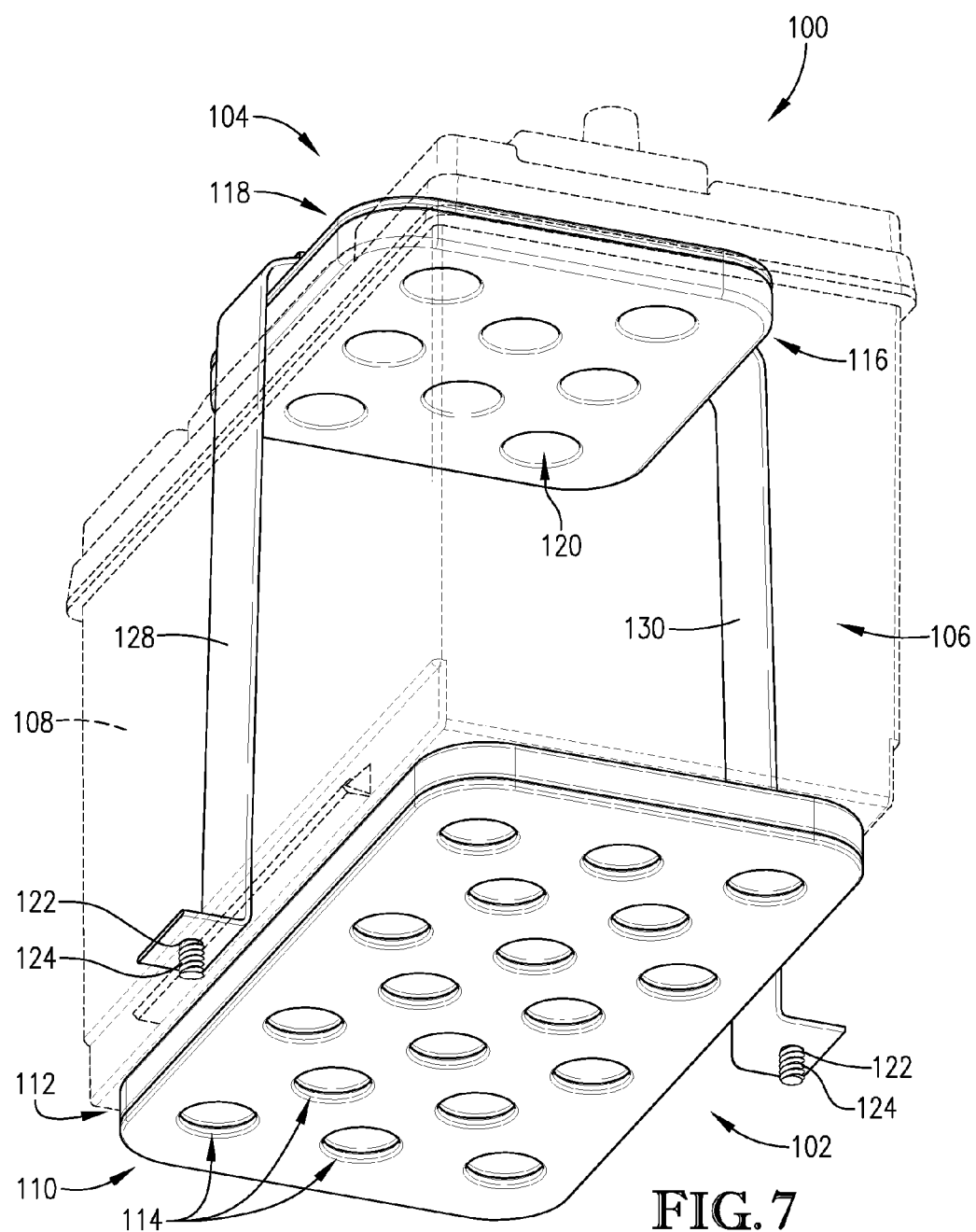
FIG. 7 is a bottom perspective view of the battery holder of FIG. 6 without the battery.
Figure 8:
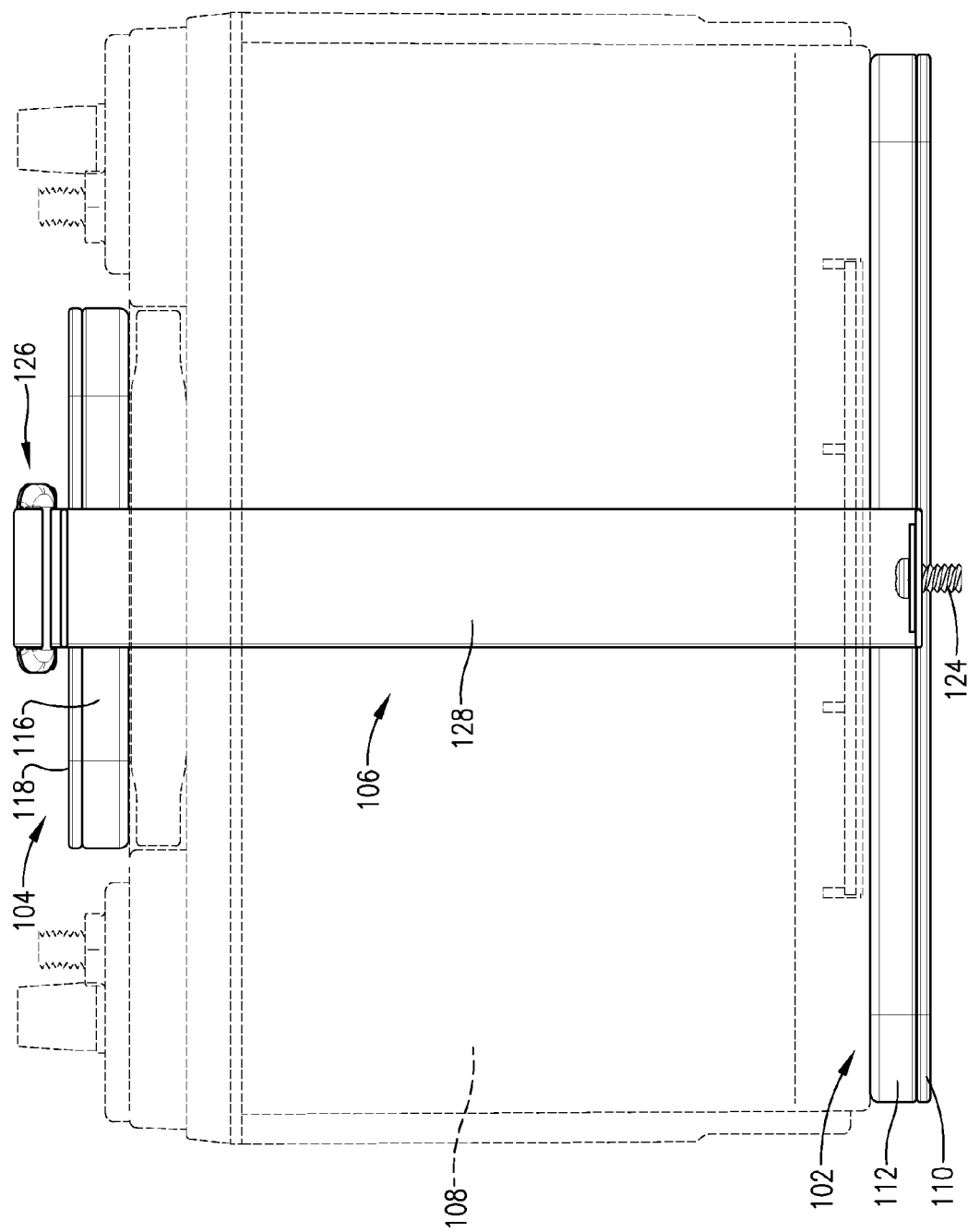
FIG. 8 is a front elevation view of the battery holder of FIG. 6.
Figure 9:
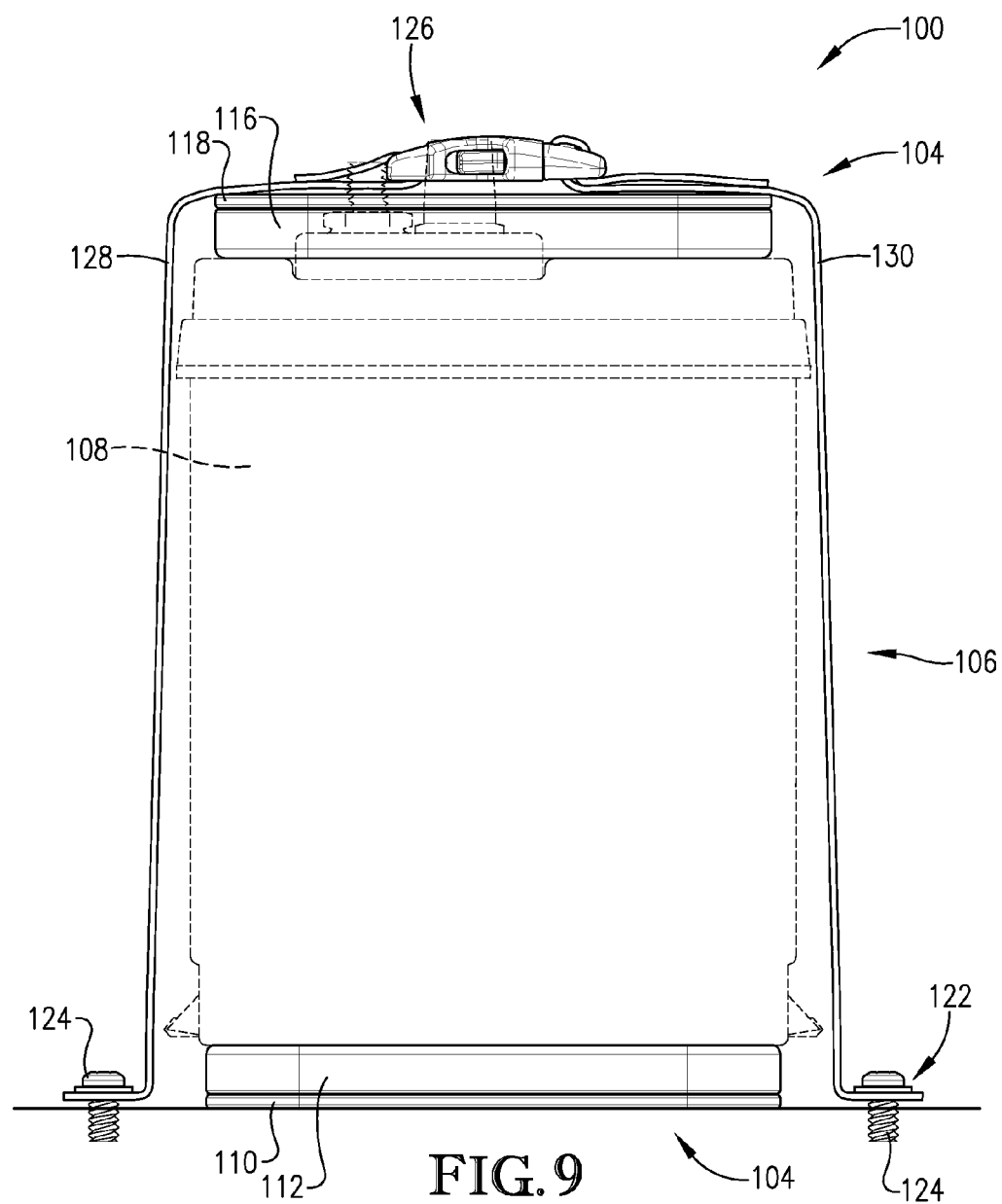
FIG. 9 is a side elevation view of the battery holder of FIG. 6.
Figure 10:
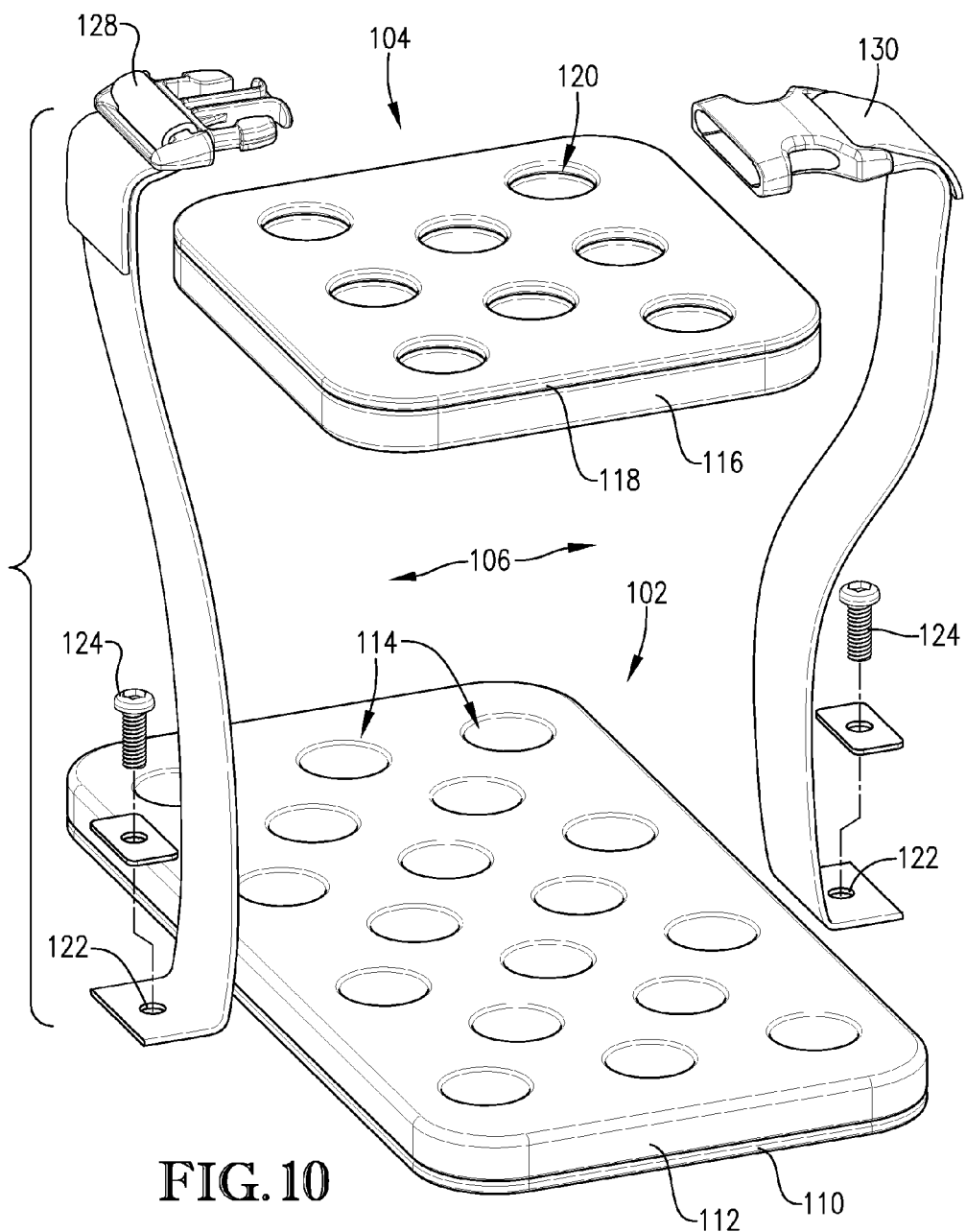
FIG. 10 is an exploded view of the battery holder of FIG. 6.

Turning now to FIGS. 6-10, a battery holder 100 constructed in accordance with a second embodiment of the present invention is illustrated. The battery holder 100 broadly comprises a lower mat 102, an upper mat 104, and a strap 106.

The lower mat 102 supports the weight of a battery 108 on a surface or mounting component of a vehicle and absorbs shocks, vibrations, and other forces. The lower mat 102 may include a lower plate 110 formed of corrosion resistant billet aluminum or any other rigid material and an upper pad 112 formed of shock absorbing material such as rubber, gel, or foam. The lower mat 102 may be rectangular or other shape and may have rounded corners. The lower mat 102 may be between 4 inches and 14 inches long, between 4 inches and 8 inches wide, and between $1/8^{th}$ inch and 2 inches thick and may be sized and shaped to accommodate batteries of any size and shape. The lower mat 102 may include a number of openings 114 extending therethrough or partially therethrough that permit the upper pad 112 of the lower mat 102 to flex and bulge when subjected to shocks, vibrations, and other forces. The openings 114 may be circles, rectangles, or any other suitable shape and may be arranged in a rectangular pattern, a staggered pattern, or any other suitable pattern. In one embodiment, the openings 114 are approximately $1/4^{th}$ to 2 inches in diameter and account for between 20 percent and 60 percent of the surface area of the lower mat 102.

The upper mat 104 absorbs additional shocks, vibrations, and other forces and may include a lower pad 116 formed of shock absorbing material such as rubber, gel, or foam and an upper plate 118 formed of corrosion resistant billet aluminum or any other rigid material. The upper mat 104 may be rectangular or other shape and may have rounded corners. The upper mat 104 may be between 2 inches and 6 inches long, between 2 inches and 6 inches wide, and between $1/8^{th}$ inch and 2 inches thick and may be sized and shaped to accommodate batteries of any size and shape. The upper mat 104 may include a number of openings 120 extending therethrough that permit the lower pad 116 of the upper mat 104 to flex and bulge when subjected to shocks, vibrations, and other forces. The openings 120 may be arranged in a pattern similar to the openings 114 of the lower mat 102. In one embodiment, the openings 114 are approximately $1/4^{th}$ to 2 inches in diameter and account for between 20 percent and 60 percent of the surface area of the lower mat 102.

The strap 106 secures the upper mat 104 on top of the battery 108 and secures the battery 108 on the lower mat 102. The strap 106 may be a band, rope, cable, or similar securement device and may include fastener holes 122 for securing the strap 106 to a vehicle mounting plate or similar support via fasteners 124 and a buckle 126 or other fastener for connecting two sections 128, 130 of the strap 106 together. The strap 106 may be any length and may be adjustable to accommodate batteries of any size and shape.

The above-described battery holder 100 may be installed in a vehicle as follows: first, the lower mat 102 is placed on a vehicle mounting plate or similar support of the vehicle. The battery 108 is then placed on the lower mat 102. The upper mat 104 is then placed on top of the battery 108. The two sections 128, 130 of the strap 106 are then secured to the vehicle mounting plate or similar support via the fasteners 124, extended upwards along the sides of the battery 108 and then connected over the upper mat 104 via the buckle 126.

When the battery holder 100 is installed in the vehicle, the lower mat 102 and the upper mat 104 protect the battery 108 by absorbing shocks, vibrations, and other forces. Specifically, when the lower mat 102 and the upper mat 104 are subjected to compressive forces, the upper pad 112 of the lower mat 102 and the lower pad 116 of the upper mat 104 compress inwardly and/or bulge outwardly to absorb or dampen the forces.

The above-described battery holder 100 provides several advantages over conventional battery holders. For example, the battery holder 100 both secures the battery 108 to the vehicle and isolates the battery holder 100 from the vehicle so as to protect the battery 108 from shocks, vibrations, and other forces. The strap 106 simplifies removing and replacing the battery 108 and allows batteries of different sizes to be secured to the battery holder 100.

Figure 11:
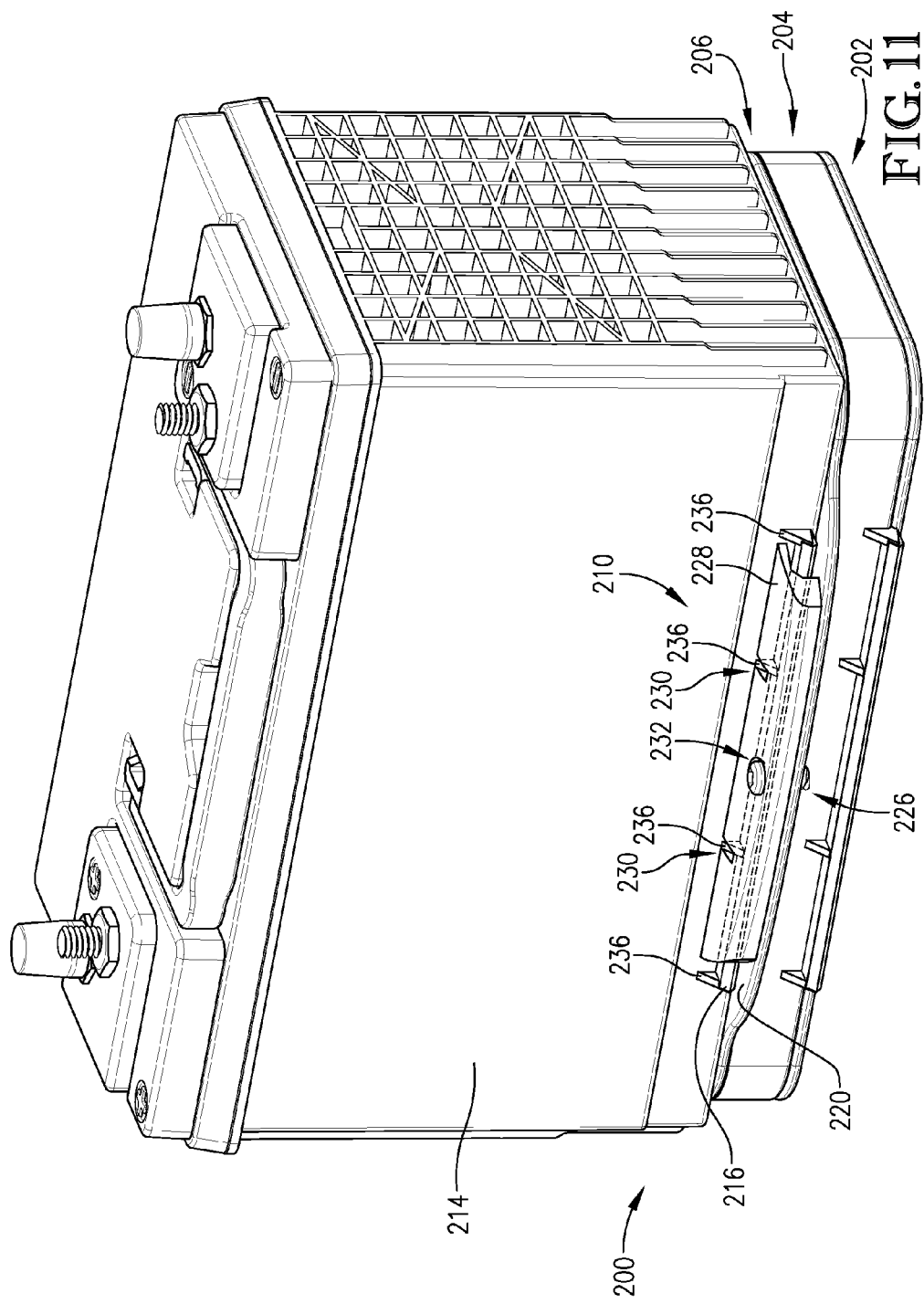
FIG. 11 is a top perspective view of a battery holder constructed in accordance with a third embodiment of the present invention and shown holding a battery.
Figure 12:
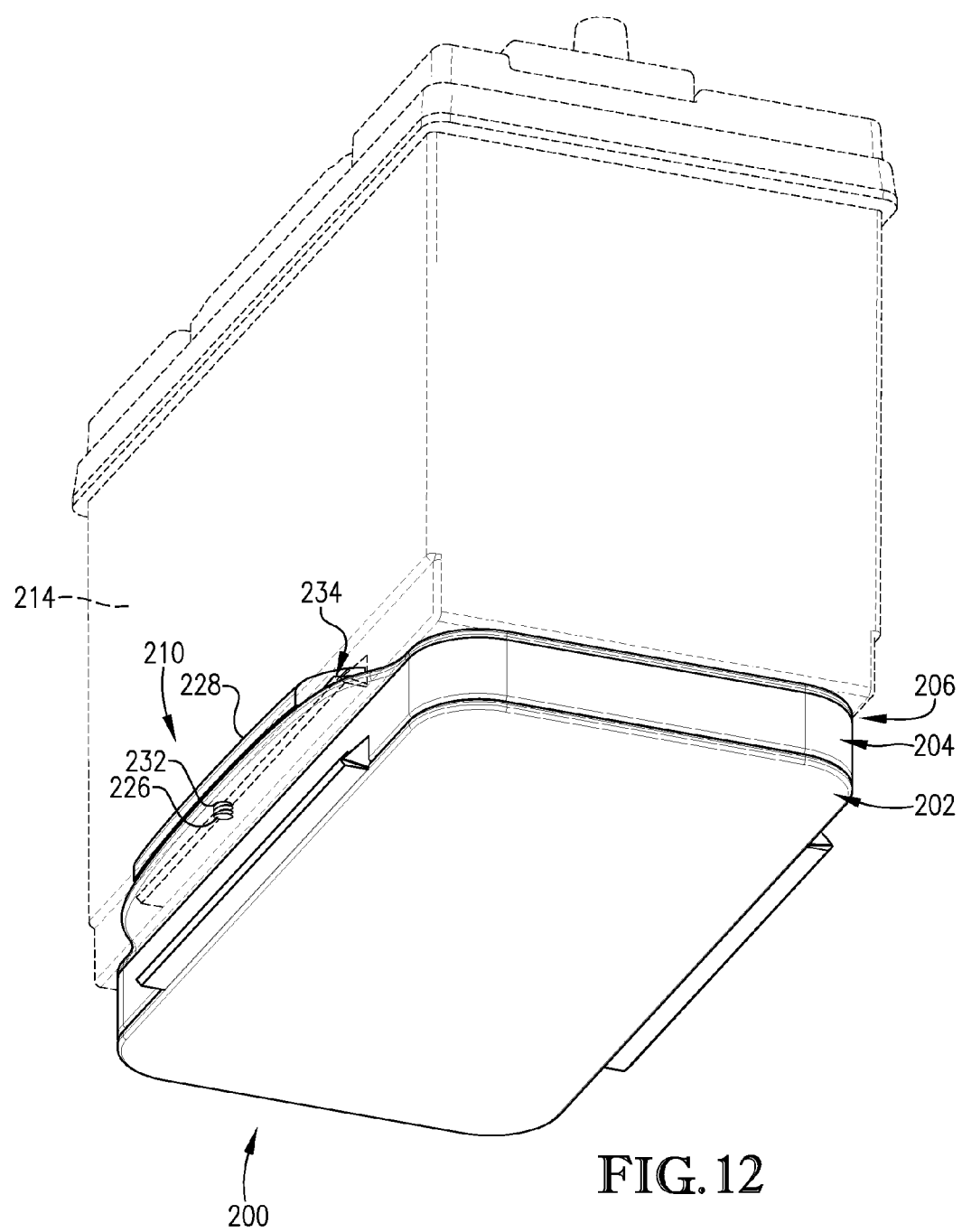
FIG. 12 is a bottom perspective view of the battery holder of FIG. 11 without the battery.
Figure 13:
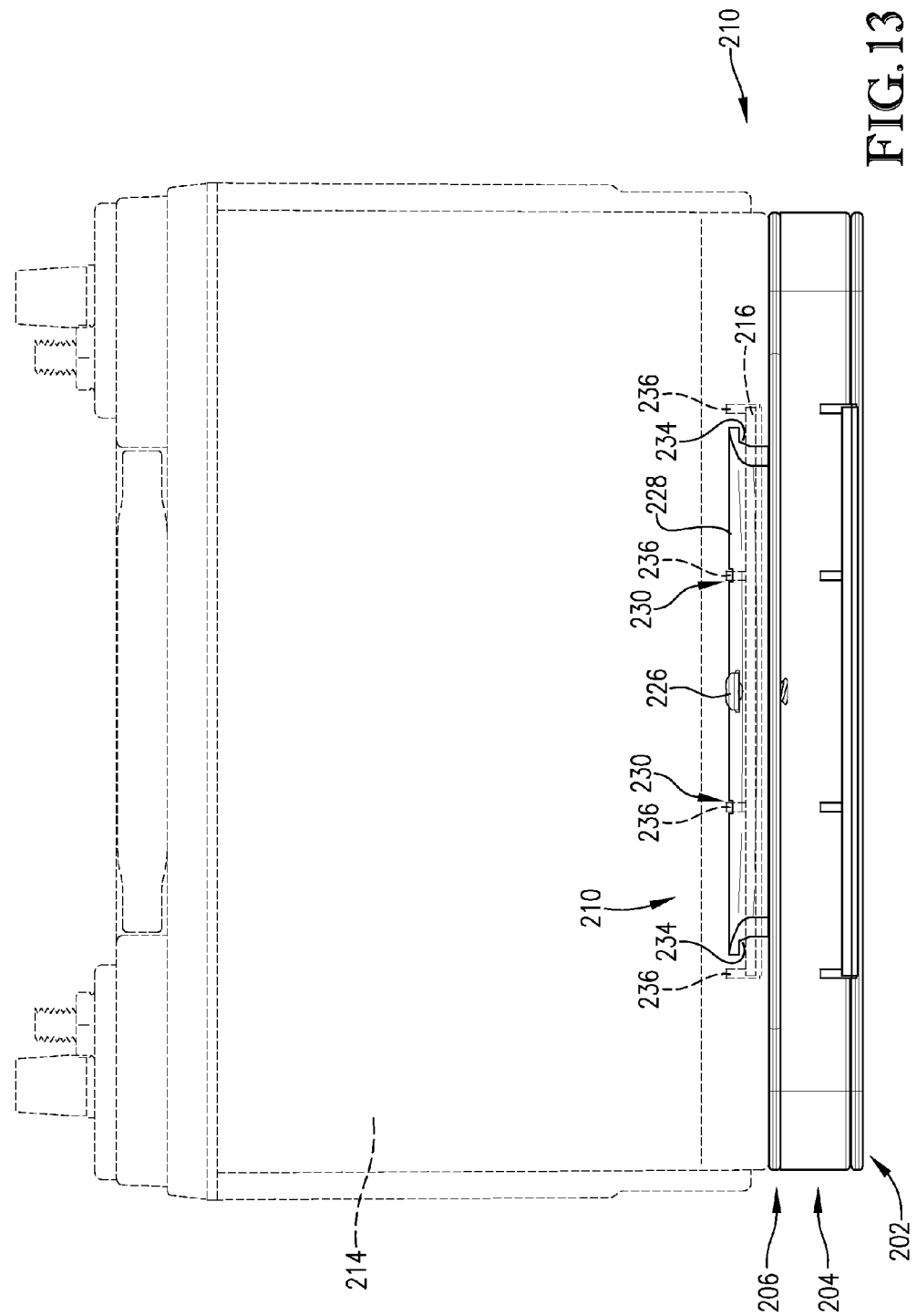
FIG. 13 is a front elevation view of the battery holder of FIG. 11.
Figure 14:
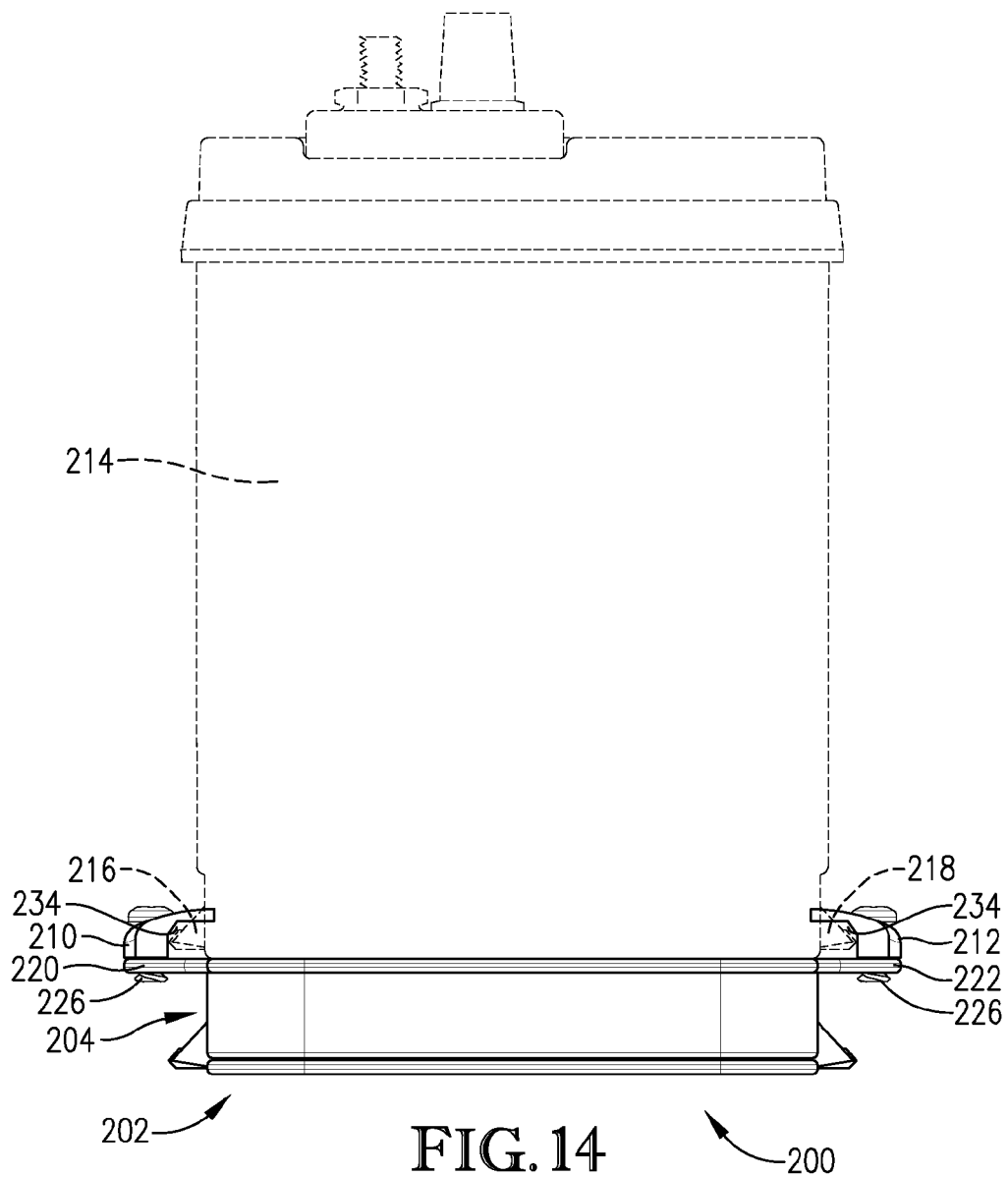
FIG. 14 is a side elevation view of the battery holder of FIG. 11.
Figure 15:
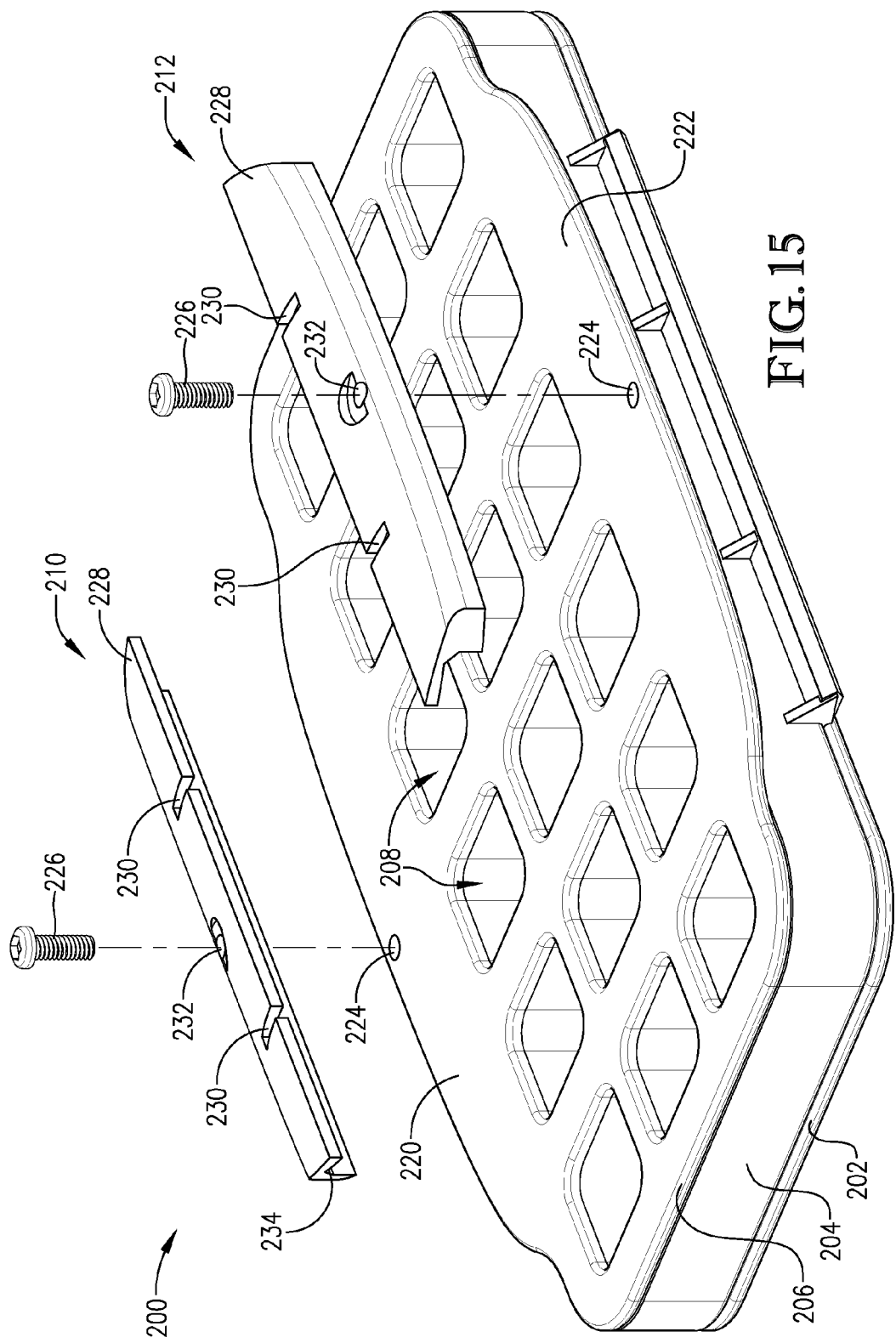
FIG. 15 is an exploded view of the battery holder of FIG. 11.

Turning now to FIGS. 11-15, a battery holder 200 constructed in accordance with a third embodiment of the present invention is illustrated. The battery holder 200 is a mat broadly comprising a bottom plate 202, a middle pad 204, an upper plate 206, a number of openings 208, and first and second clips 210, 212.

The bottom plate 202 supports a battery 214 having left and right mounting flanges 216, 218 on a battery mounting surface or battery holding area and may be formed of a rigid material such as plastic, metal, or any other suitable material.

The middle pad 204 absorbs shocks, vibrations, and other forces and may be formed of a shock absorbing material such as rubber, gel, or foam.

The upper plate 206 supports the bottom of the battery 214 and includes left and right flanges 220, 222 and fastener holes 224. The left and right flanges 220, 222 extend from elongated sides of the upper plate 206 for fastening the clips 210, 212 thereto. The left and right flanges 220, 222 may have smooth edges for a more ergonomic design. The fastener holes 224 receive fasteners 226 therethrough for securing the clips 210, 212 to the flanges 220, 222.

The bottom plate 202, middle pad 204, and upper plate 206 may be glued or fastened together and may be between 4 and 14 inches long, between 4 and 8 inches wide, and between $1/8^{th}$ and 2 inches thick with rounded corners for a more ergonomic shape.

The openings 208 improve dissipation of vibrations and forces and may extend through the middle pad 204 only, the middle pad 204 and the upper plate 206, or the bottom plate 202, the middle pad 204, and the upper plate 206. The openings 208 may be between $1/4^{th}$ inch wide and $1/4^{th}$ inch long to 2 inches side and 2 inches long. The openings 208 may be arranged in a rectangular pattern, a staggered pattern, or any other pattern and may occupy approximately 20 percent to 60 percent of the surface area of the bottom plate 202, the middle pad 204, and/or upper plate 206. The openings 208 allow the middle pad 204 to bulge outwardly and stretch inwardly to absorb and dampen vibrations and forces when the middle pad 204 is subjected to compression and tension forces.

The clips 210, 212 secure the battery 214 to the upper plate 206 of the battery holder 200 and each include one or more tabs 228, one or more slits 230, and a fastener hole 232.

The tabs 228 extend inwardly for engaging the flanges 216, 218 of the battery 214 and form a receiving area 234 for positioning the flanges 216, 218 of the battery 214 therein.

The slits 230 extend into or between the tabs 228 for receiving small vertical ribs 236 extending from the flanges 216, 218 of the battery 214. The slits 230 prevent the battery from sliding parallel to the clips 210, 212 of the battery holder 200. The slits 230 may be approximately $1/8^{th}$ of an inch to approximately $1/4^{th}$ of an inch for sufficiently restricting the ribs 236 of the battery 214.

The fastener hole 232 receives one of the fasteners 226 therethrough for securing one of the clips 210, 212 to one of the flanges 220, 222 of the upper plate 206.

The above-described battery holder 200 may be installed in a vehicle as follows: first, the battery holder 200 is placed on the battery mounting surface or battery receiving area of the vehicle. The battery 214 is then placed on the upper plate 206 of the battery holder 200 with the flanges 216, 218 of the battery 214 positioned near the flanges 220, 222 of the upper plate 206. The clips 210, 212 are then positioned on the flanges 220, 222 with the fastener holes 232 of the clips 210, 212 aligned with the fastener holes 224 of the flanges 220, 222. The tabs 228 of the clips 210, 212 are also positioned over the flanges 216, 218 of the battery so that the flanges 216, 218 are positioned in the receiving areas 234 and the ribs 236 are positioned in the slits 230. The fasteners 226 are then inserted into the fastener holes 224, 232 and tightened until the clips 210, 212 are affixed to the upper plate 206 of the battery holder 200.

When the battery holder 200 is installed in the vehicle, the middle pad 204 protects the battery 214 by absorbing shocks, vibrations, and other forces. Specifically, when the battery holder 200 is subjected to compressive forces, the middle pad 204 compresses inwardly and/or bulges outwardly to absorb or dampen the forces.

The above-described battery holder 200 provides several advantages over conventional battery holders. For example, the battery holder 200 does not require the battery 214 to be covered or enclosed, which makes the battery easier to access, clean, and replace. This also allows the battery holder 200 to be compatible with many different types and sizes of batteries. The battery holder 200 is also small and compact, which reduces manufacturing costs and simplifies installation.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A battery holder for securing and at least partially mechanically isolating a battery from a vehicle, the battery holder comprising:
    a rigid bottom plate for placing the battery holder on a battery mount or other surface;
    a middle pad positioned above and connected to the rigid bottom plate and formed of shock absorbing material;
    a rigid upper plate positioned above and connected to the middle pad, the rigid upper plate including first and second flanges including one or more fastener holes extending therethrough;
    a number of openings extending through the middle pad so that the middle pad may bulge outwardly when subjected to compressive forces and stretch inwardly when subjected to tension forces for absorbing vibrations and, wherein the openings occupy between approximately 20% to 60% of a surface area of the middle pad; and
    first and second clips each including an inwardly extending tab, one or more slits, and one or more fastener holes, the tabs being configured to extend over flanges of the battery and form battery flange receiving areas when the clips are attached to the flanges of the upper plate via fasteners inserted into the fastener holes of the clips and the fastener holes of the upper plate, the slits being configured to receive ribs of the battery for preventing the battery from sliding longitudinally off of the battery holder,
    the middle pad forming the only physical connection between the rigid bottom plate and the rigid upper plate such that no unmitigated pathways exist for shocks and vibrations to reach the battery from the vehicle so that the battery is mechanically isolated from the vehicle.

2. The battery holder of claim 1, wherein each clip has two slits for retaining two ribs of the battery therein.

3. The battery holder of claim 1, wherein the openings are substantially rectangular.

4. The battery holder of claim 1, wherein the openings are aligned in rows and columns.

5. A battery holder for securing and mechanically isolating a battery from a vehicle, the battery holder comprising:
    a rigid bottom plate for placing the battery holder on a battery mount or other surface;
    a rigid upper plate including first and second flanges;
    a middle pad positioned between and connected to the rigid bottom plate and the rigid upper plate, the middle pad being formed of shock absorbing material and forming the only physical connection between the rigid bottom plate and the rigid upper plate such that no unmitigated pathways exist for shocks and vibrations to reach the battery from the vehicle so that the battery is mechanically isolated from the vehicle; and
    first and second clips each including an inwardly extending tab configured to extend over flanges of the battery and form battery flange receiving areas when the clips are attached to the flanges of the upper plate.

6. The battery holder of claim 5, wherein the first and second flanges of the rigid upper plate and the first and second clips include fastener openings for receiving fasteners therethrough for connecting the first and second clips to the rigid upper plate.

7. The battery holder of claim 5, wherein the first and second clips include slits configured to receive ribs of the battery therein for preventing the battery from sliding longitudinally off of the battery holder.

\* \* \* \* \*